US011107009B2

United States Patent
Bryant et al.

(10) Patent No.: US 11,107,009 B2
(45) Date of Patent: Aug. 31, 2021

(54) MANAGING USER TRANSPORTATION NEEDS WITHOUT USER INTERVENTION

(71) Applicant: International Business Machines Corporation, Armonk, NY (US)

(72) Inventors: Jay S. Bryant, Rochester, MN (US); James E. Carey, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 609 days.

(21) Appl. No.: 14/739,000

(22) Filed: Jun. 15, 2015

(65) Prior Publication Data

US 2016/0364657 A1    Dec. 15, 2016

(51) Int. Cl.
*G06Q 10/02* (2012.01)
*G06Q 10/06* (2012.01)
*G06Q 50/30* (2012.01)

(52) U.S. Cl.
CPC ..... *G06Q 10/02* (2013.01); *G06Q 10/063114* (2013.01); *G06Q 50/30* (2013.01)

(58) Field of Classification Search
CPC ............ G01C 21/3407; G01C 21/3691; G06Q 50/30; G06Q 10/02; G06Q 10/047;
(Continued)

(56) References Cited

U.S. PATENT DOCUMENTS 5,948,040 A * 9/1999 DeLorme ............... G01C 21/36
340/990
6,697,730 B2 * 2/2004 Dickerson .............. G06Q 50/30
701/465

(Continued)

FOREIGN PATENT DOCUMENTS

| CN | 101795433 A | 8/2010 |
| CN | 102496074 A | 6/2012 |

OTHER PUBLICATIONS

Anonymous, "Taxi dispatch and notification system through peer-to-peer mobile application", An IP.com Prior Art Database Technical Disclosure, Sep. 1, 2010. IP.com No. 000199397.
(Continued)

*Primary Examiner* — Florian M Zeender
*Assistant Examiner* — Milena Racic
(74) *Attorney, Agent, or Firm* — Scott S. Dobson

(57) ABSTRACT

A software application on a device manages transportation procurement for a user. The software application collects application data. The application data is from a plurality of software applications on the device. The application detects a triggering event. The triggering event is based on the collected application data and corresponds to a state of the user. The application determines a transportation need of the user. The need is determined in response to the triggering event. The application determines the need based on the application data. The transportation need includes both a time parameter and a location parameter. The need is determined without direct input from the user. The application generates candidate transportation options which satisfy the need. These options are generated based on the time and location parameters. The application provides the candidate options to the user.

20 Claims, 5 Drawing Sheets

(58) Field of Classification Search
CPC ..... H04W 4/023; H04W 4/021; H04W 4/029; H04L 67/18; G08G 1/202
See application file for complete search history.

(56) References Cited

U.S. PATENT DOCUMENTS

| | | | | |
|---|---|---|---|---|
| 8,126,903 | B2* | 2/2012 | Lehmann | G06Q 10/06 707/758 |
| 8,606,801 | B2* | 12/2013 | Goldstein | G06Q 50/14 707/758 |
| 8,655,970 | B1* | 2/2014 | Cohen | G06Q 30/00 455/412.2 |
| 8,725,612 | B2* | 5/2014 | Mundinger | G06Q 40/08 705/35 |
| 9,092,801 | B2* | 7/2015 | Chang | G06Q 30/0255 |
| 9,488,487 | B2* | 11/2016 | Andersen | G01C 21/3617 |
| 2004/0177109 | A1 | 9/2004 | Lee | |
| 2006/0088187 | A1 | 4/2006 | Clarkson et al. | |
| 2010/0094529 | A1* | 4/2010 | Gupta | G06F 16/40 701/117 |
| 2012/0265580 | A1 | 10/2012 | Kobayashi et al. | |
| 2013/0046456 | A1 | 2/2013 | Scofield et al. | |
| 2013/0132140 | A1 | 5/2013 | Amin et al. | |
| 2013/0144831 | A1 | 6/2013 | Atlas | |
| 2014/0300449 | A1 | 10/2014 | Kounavis | |
| 2015/0142518 | A1 | 5/2015 | Farinha Gomes Félix | |
| 2015/0221048 | A1* | 8/2015 | Zenhausern | G06Q 50/14 705/26.5 |
| 2015/0262430 | A1* | 9/2015 | Farrelly | H04L 67/306 705/13 |
| 2016/0117610 | A1 | 4/2016 | Ikeda et al. | |
| 2016/0300318 | A1 | 10/2016 | Godil | |
| 2016/0335576 | A1 | 11/2016 | Peng | |
| 2016/0364823 | A1* | 12/2016 | Cao | G06Q 50/30 |
| 2017/0300848 | A1 | 10/2017 | Shoval et al. | |
| 2018/0366004 | A1* | 12/2018 | Laetz | G08G 1/202 |

OTHER PUBLICATIONS

Bryant, et al., "Managing Transportation Deployment Using Customer Activity". U.S. Appl. No. 14/739,010, filed Jun. 15, 2015.
List of IBM Patents or Patent Applications Treated as Related.
Unknown, "Uber: The Company", Uber, Dec. 15, 2014. https://www.uber.com/about. 7 pages.
Unknown, "Personal rapid transit", Wikipedia: The Free Encyclopedia, last modified on Oct. 21, 2014. http://en.wikipedia.org/wiki/Personal_rapid_transit. 23 pages.
Anderson et al., "Building a Transportation Information System Using Only GPS and Basic SMS Infrastructure", IEEE, May 2009, DOI: 10.1109/ICTD.2009.5426678, 10 pages.

* cited by examiner

MANAGING USER TRANSPORTATION NEEDS WITHOUT USER INTERVENTION

BACKGROUND

Trends in transportation allow a person desiring transportation to take much more control in the procurement of transportation. Smart phones allow such a person to request a vehicle to specific locations at specific times, often through the use of specialized software applications on the smart phone. A central dispatch may then deploy transportation to those locations at those times. Users may also communicate directly with publically available vehicles to obtain transportation.

SUMMARY

Aspects of the disclosure are directed towards a software application on a device managing transportation procurement for a user. The software application may collect application data. The application data may be from a plurality of software applications on the device (e.g., mobile phone). The application may detect a triggering event. The triggering event may be based on the collected application data and may correspond to a state of the user. The application may determine a transportation need of the user. The need may be determined in response to the triggering event. The application may determine the need based on the application data. The transportation need may include both a time parameter (e.g., when the user needs transportation) and a location parameter (e.g., where the user needs transportation). The need may be determined without direct input from the user (e.g., the application may determine that the user has a transportation need without the user telling the application that he has a transportation need). The application may generate candidate transportation options which satisfy the need. These options may be generated based on the time and location parameters. The application may provide the candidate options to the user. The candidate options may be provided to the user in the form of a notification The software application may learn new triggering event templates by monitoring application data. The user may have the ability to confirm these templates, or to modify existing templates. The application may communicate the transportation needs directly to transportation provider. In some embodiments, the application may thusly communicate autonomously without prompting from the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
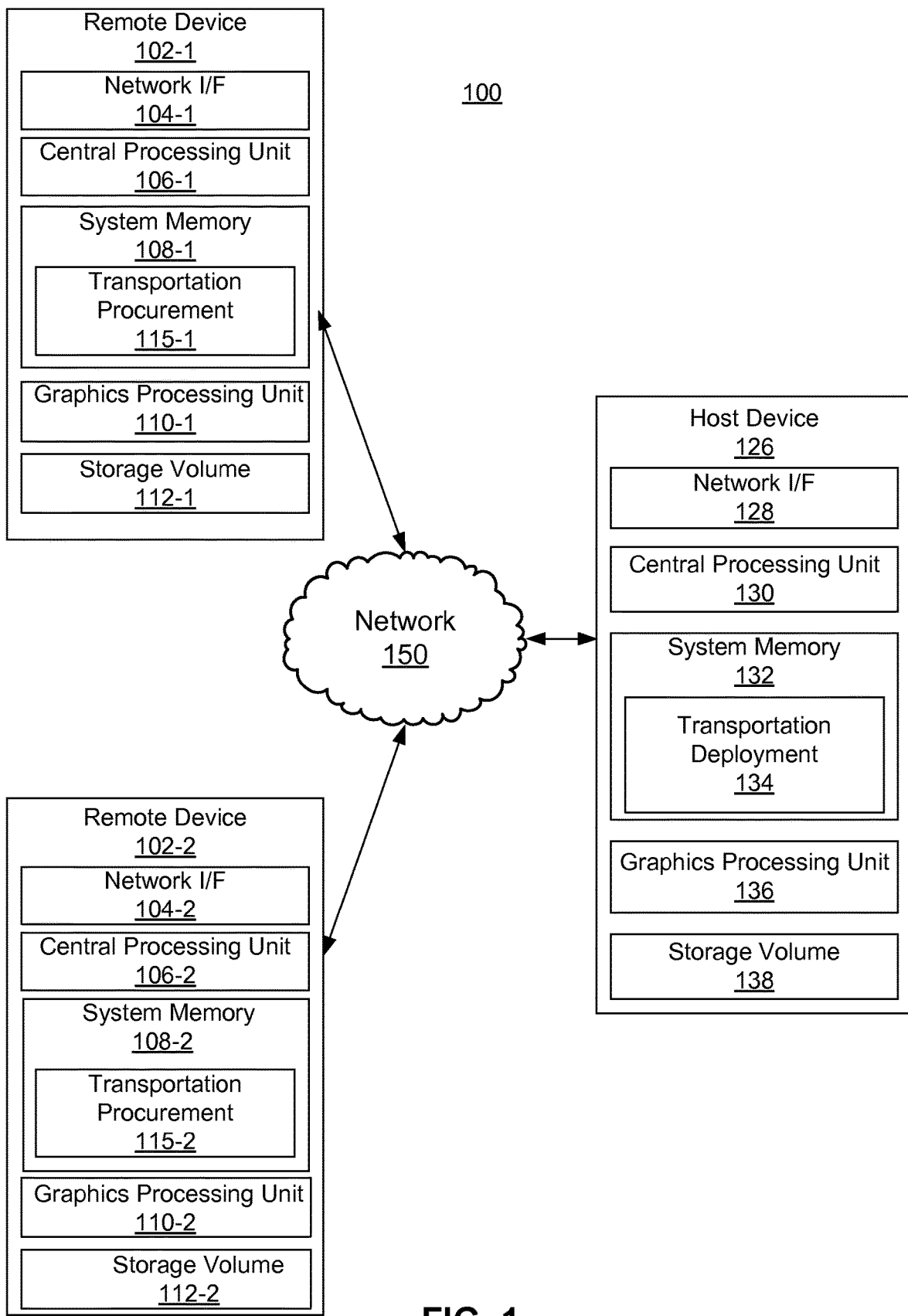
FIG. 1 is a system for managing transportation procurement and deployment, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for managing transportation procurement and deployment. An individual may regularly use transportation. The individual may consistently use transportation in response to certain types of events. A software application on a device used by the individual may learn what these types of events are. The application may detect instances of these types of events, and may determine specific transportation needs which arise from them. The application may determine transportation solutions to these transportation needs without input from the individual. A transportation company may receive a plurality of these transportation needs from different prospective customers. The company may use these needs to extrapolate where transportation may be needed in the future. Using these extrapolations, the company may deflect some transportation from standard procedures to take advantage of this real-time information. While the present disclosure is not necessarily limited to such applications, various aspects of the disclosure may be appreciated through a discussion of various examples using this context. Examples and example values discussed herein are provided by way of example only and are not to be construed as limiting.

In instances, software applications on mobile devices may give users the ability to communicate directly and in real-time with transportation. This direct and real-time communication may result in quicker response times, which may lead to greater customer satisfaction and therein customer retention by transportation providers. However, such software applications which provide direct and real-time communication may require direct input from the user throughout the process, starting with the user identifying their own need and continuing through the user instigating communication with a transportation provider.

On the other hand, transportation providers may use such direct communication between users and individual vehicles to supplement scheduling plans regarding transportation deployment. In instances, scheduling plans may be based off of historical tendencies, sending transportation to different locations based on the day of the week, the time of the day, and prescheduled events. Within these confines, transportation providers may be left to try to respond to requests for transportation which often do not come until transportation is already needed. In this way, transportation providers may regularly operate in "catch-up" mode where the provider is reacting to current needs for transportation. Alternatively, transportation providers may attempt to predict where transportation will be needed, but may only have data from previous weeks, months, and years to update a scheduling model.

Aspects of the disclosure include a user using a software application (e.g., transportation application) on a mobile device to manage transportation needs. The transportation application may detect an event (e.g., a triggering event) which signifies the user has a potential need for transportation. For example, the transportation application could detect a triggering event where the user paid the tab at a restaurant. In response to this triggering event, the transportation application could determine where and when the user might need transportation. The transportation application could pull data from other applications (e.g., a global positioning system (GPS) application, a calendar application, a mobile payment application, etc.) or from a database (e.g., a user history database, financial records, etc.). In this example, the user may need transportation at the restaurant within 10 minutes. The transportation application may determine means of satisfying this transportation need, such as nearby taxis, scheduled buses, or scheduled trains. The transportation application may then notify the user with these means using the mobile device. In some embodiments, the transportation application may act to arrange for one of these means by such actions as hailing a cab. By detecting and arranging for transportation without input from the user, the transportation application may see increased response time to transportation needs. By increasing response time, customer satisfaction and retention may be increased.

The transportation application may have the ability to classify events as triggering events. The transportation application may classify events as triggering events by detecting that users may consistently act to acquire transportation following certain unique datasets. The transportation application may identify these unique datasets and classify them as triggering events. To identify these datasets the transportation application may analyze data from software applications on the mobile device. Some of these applications, such as a GPS application, a mobile payment application, or a calendar application, may detect/receive/store these unique sets of data as part of their standard operation, such as calendar notification for event "happy hour downtown." The transportation application may then detect the user signaling a current need for transportation a short time later, such as by calling a taxi company. At a later point in time, the software applications may detect a second set of data which is similar to the previous unique set, such as a calendar notification for "happy hour uptown" in 30 minutes. The application may compare the first event ("happy hour downtown") and the second event ("happy hour uptown") and determine that the two events fall under the same category. In response to this determination, the transportation application may ask the user if the user would like transportation. If the user replies in the affirmative, the transportation application may classify the unique dataset as indicating a triggering event. By learning new triggering events in this way the transportation application may have improved accuracy and precision in detecting triggering events which correlate to transportation needs for individual users.

A transportation provider (e.g., a taxi company, a transportation operator, etc.) may receive notifications of future transportation needs from users within the operating area of the provider. The transportation provider may then deploy its supply of transportation using these notifications of future need to maximize utilization of said supply. For example, a taxi company in a large city may have taxis spread across the city on a Wednesday afternoon by a standard array of hotels, restaurants, and local attractions. The provider may receive updates from a few hundred users across the city signaling a probability for upcoming demand in some areas of the city. The provider may likewise have unused supply in other areas of the city. Accordingly, the provider may redistribute taxis across the city per the real-time information. In this way a transportation provider may maximize the capture of customer demand and reduce the response time of said capture.

Turning now to the figures, FIG. 1 is a diagrammatic illustration of an example computer system 100, consistent with embodiments of the present disclosure. In certain embodiments, the computer system 100 can include one or more remote devices 102 and one or more host devices 126. In certain embodiments, the host device 126 may be a mobile device used by a transportation user/customer. In other embodiments, the host device 126 may be a computing device used by the transportation provider. Although two remote devices 102-1, 102-2 are shown in FIG. 1 for purposes of illustration, it is to be understood that one or more than two remote devices can be included in other embodiments. In embodiments, the user accounts which are submitting transportation needs to the transportation provider host device 126 may be on the remote devices 102. Remote devices 102 and host device 126 may be located separately from each other and communicate over a network 150 in which the host device 126 comprises a central hub from which remote devices 102 can establish a communication connection. Alternatively, the host device and remote devices may be configured in any other suitable relationship (e.g., in a peer-to-peer or other relationship).

In certain embodiments the network 150 can be implemented using any number of any suitable communications topologies (e.g., wide area network (WAN), local area network (LAN), Internet, Intranet, hardwire, wireless link, etc.). The transportation needs from the user accounts on the remote devices 102 may be transmitted to the transportation provider host device 126 over the network 150. In certain embodiments, the network 150 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

In certain embodiments, the host device 126 can include a transportation deployment function 134 included in the system memory 132. The transportation deployment function 134 may be configured to detect incoming transportation needs and create a probabilistic model for how much transportation will be needed across a service area. In certain embodiments, remote devices 102 can include a transportation procurement function 115. The transportation procurement function 115 may be configured to detect events which predict transportation needs and provide options for satisfying said transportation needs. Other configurations of the transportation deployment function 134 and transportation procurement function 115 are possible.

Consistent with various embodiments, the host device 126 and remote devices 102 may be implemented as a computer system including a respective set of system components. In certain embodiments, one or more of host device 126 and remote devices 102 may be equipped with a respective display or monitor. In certain embodiments, each computer system may include at least one respective central processing unit 106, 130; respective system memories 108, 132; respective internal or external network interface or communications devices 104, 128 (e.g., modem, network cards, etc.); and/or respective optional input devices (e.g., a keyboard, mouse, or other input device), as well as commercially available and custom software (e.g., browser software, communications software, server software, natural language processing software, search engine and/or web crawling software, filter modules for filtering content based upon predefined criteria, etc.). In certain embodiments, host device 126 and remote devices 102 may each include a respective graphics processing unit 110, 136 and a respective storage volume 112, 138. In certain embodiments, transportation needs may be created by the transportation procurement function 115 and collected from the system components described herein by the transportation deployment function 134 to fully utilize the real-time user information. Other system components and configurations of host device 126 and remote devices 102 are also possible.

In certain embodiments, each of the computer systems may be implemented as one of a server, desktop, laptop, or hand-held devices. In addition, the transportation deployment function 134 and/or transportation procurement function 115 may include one or more modules to perform the various functions of embodiments described herein.

Figure 2:
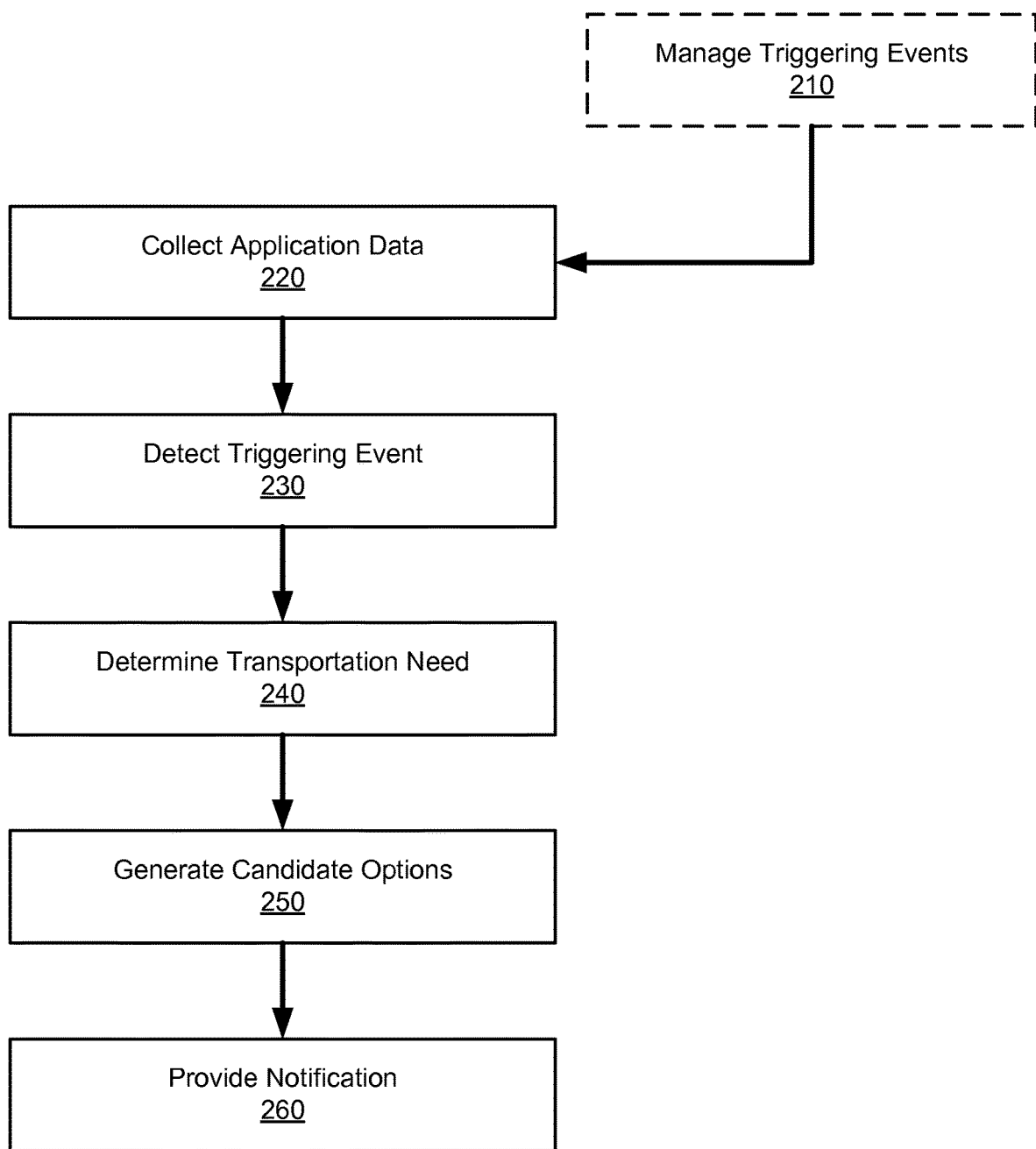
FIG. 2 is a method for a software application managing transportation procurement for a user, according to embodiments.

FIG. 2 is a flowchart illustrating a method 200 for managing transportation needs of a user with a software application (e.g., transportation application). The transportation application may be processed by a mobile device of the user. In some embodiments, the device may be a cell phone. The visual arrangement of blocks in the flowchart of FIG. 2 is not to be construed as limiting the order in which the individual acts/operations may be performed, as certain embodiments may perform the operations of FIG. 2 in alternative orders. Blocks which are depicted with dashed lines are to be construed as optional operations.

At block 210 the transportation application may manage triggering events. Triggering events may be user states which are detectable by software applications on a mobile device, wherein the user states have a high likelihood of preceding a need for transportation. For example, a triggering event could be a user paying for a tab at a restaurant, a user being a given distance (e.g., 5 miles) from an appointment which is to start within some predetermined time frame (e.g., 15 minutes in the future), or a user being at a movie which just concluded. Each of these user states (e.g., paying for a tab, an appointment in 15 minutes, or a conclusion of a movie) may have a high likelihood that the associated user will need transportation soon. In some embodiments, triggering events must surpass some likelihood to be used by the transportation application (e.g., each triggering event must have at least a 75% chance of preceding a transportation need). In certain embodiments, triggering events may be predetermined by the transportation application, and no additional triggering events can be created. In such embodiments, the triggering events may include more uniform situations which apply across a high percentage of the population and less situations which are tailored towards specific individuals.

In some embodiments, the transportation application may create the triggering events. Creating triggering events may include associating unique sets of application data with the user later utilizing transportation. Sets of application data may be information which is created/collected/stored by software applications on the mobile device of the user. For example, the set of application data may include GPS data from a location application, appointment data from a calendar application, and payment data from a mobile payment application. In this way, triggering events can be managed to look for specific activities of a single user which precede a transportation need, therein learning the transportation habits of the user over time. Creating triggering events is discussed in greater detail in method 300 of FIG. 3.

At block 220 the transportation application collects application data. This application data may be information from other software applications which are processed on the mobile device. This data may be received from the user and stored by a particular software application of the device, such as appointment data received and stored by a calendar application. The data could also be information which is tracked/calculated by a particular software application of the device, such as GPS data from a location application or time data from a clock application. The data may alternatively be real time data processed by a particular software application of the device, such as payment data by a mobile payment application. In some embodiments, the data may be stored externally to the mobile device and gained through a connection to the internet, such as bank or credit card information stored on a secure server and accessed remotely through the mobile device. In certain embodiments, the transportation application may receive special permission to see the data of the other software applications on the device.

In some embodiments, incoming or new data of the mobile device of the user may be analyzed by the transportation application, and in this way the transportation application is constantly collecting application data. The transportation application may then process the data per method 200. In other embodiments, the transportation application may only analyze new or incoming data of certain applications. For example, the transportation application may only receive new or incoming data from the applications which have a high correlation with current/future needs (e.g., location applications, calendar applications, social media applications) and may not receive data from applications which have a low correlation (e.g., calculator applications, gaming applications). Alternatively, the transportation application may configure other software applications of the device to alert the transportation application when there is new/incoming data, at which point the transportation application may determine whether or not to collect this data.

At block 230 the transportation application detects a triggering event. The transportation application may detect the triggering event using the application data collected in block 220. For example, the application data may be payment data from a mobile payment application of the mobile device. The transportation application may detect that the user has used this mobile payment application to pay for a bill at a restaurant. This payment may signify an 80% chance of needing transportation. The transportation application may then classify this payment as a triggering event which has been detected.

The triggering event may have been created by the transportation application in block 210. In other embodiments, the triggering event is one of a group of predetermined triggering events which came with the transportation application. For example, the group of predetermined triggering events may include such situations as "paid at restaurant" (e.g., payment data at an establishment which qualifies as eatery), "upcoming appointment" (e.g., calendar data, GPS data, and clock data which, in conjunction, signify an appointment soon enough and far enough away to require transportation), or "at mall for 90 minutes" (e.g., GPS data and clock data which, in conjunction, signify a likely upcoming venue change).

In some embodiments, a user may select or edit triggering events of the set of predetermined triggering events. For example, a user may have numerous appointments which the user does not plan to keep, and therefore may elect to have the transportation application ignore predetermined triggering events relating to upcoming appointments. Alternatively, a user may typically stay at single venues for 3 hours at a time, and may therein edit the triggering event "at mall for 90 minutes" to be "at mall for 180 minutes" to tailor the triggering event to the user's behaviors.

At block 240 the transportation application determines a transportation need of the user. A transportation need may be a need of a user to be transported from a specific place at a specific time in the near future. The transportation application may represent the specific place with a location parameter and the specific time with a time parameter. The transportation application may determine the transportation need in response to the triggering event. For example, the transportation application may detect the triggering event of a movie concluding. In response to this, the transportation application may determine the user has a need for transportation at the movie theater in the next 10 minutes. For another example, the transportation application may detect a triggering event of a haircut appoint in 30 minutes for a user. The transportation application may accordingly determine a transportation need at the user's location in 15 minutes.

The transportation application determines the transportation need without direct input or intervention from the user. Direct input to the transportation application may be a command or prompt for the application provided by the user to a GUI (graphical user interface) or other interface (e.g., a vocal interface or tactile interface) of the application. Any data gained through actions of the user (e.g., GPS data as a result of the user moving, payment data as a result of the user paying, texting data as a result of the user communicating, social data as a result of the user posting on social media) may be collected and analyzed through intermediaries (e.g., other software applications on the mobile device), such that the user does not directly interact with the transportation application in block 220, 230, or 240. Put differently, the transportation application may collect data from the mobile device, detect a triggering event, and determine a transportation need in response to this triggering event while the user performs actions not directly related to the transportation application, potentially leaving the user unaware of these actions of the transportation application. By avoiding direct input from the user, the transportation application may have performance benefits by acting on a need for transportation at the conception of the need rather than the realization of the need by the user.

The transportation application determines the transportation need using the application data collected in block 220. Using the application data may include classifying the triggering event and pulling certain aspects of the application data to determine the location and time of the transportation need. In some embodiments, the transportation application will use different subsets of the application data depending upon the triggering event. For example, if the triggering event is "payment of restaurant bill" the transportation application may only use time data and GPS data to determine a transportation need a given amount of time in the future at the user's current location. Different embodiments of the transportation application may determine the time until the need (e.g., the time parameter) in different ways. For example, the transportation application may determine the time parameter by applying preset rules. For example, the time parameter for triggering events involving restaurants can be a predetermined amount of time (e.g., seven minutes) after bill payment. Alternatively, the transportation application may determine the time parameter by checking a historical record of the user (e.g., a record of previous transportation needs maintained by the transportation application) which shows the average amount of time between the triggering event and the user's need for transportation (e.g., the average amount of time between paying a restaurant bill and needing transportation).

In certain embodiments, the transportation application may need software application data beyond GPS and time data. For example, the transportation application may have collected data through incoming text messages of "make sure to pick up our son from practice in two hours." Analyzing the syntax of this text, the transportation application may detect a triggering event "practice pickup." In order to determine the transportation need, the transportation application may need the text data to detect when the text arrived and what time the pickup was referencing (e.g., "two hours") in addition to GPS data of the current position of the user.

In some embodiments, the transportation application may assign a probability to the transportation need. The probability may be the likelihood that the transportation need will come to fruition. The transportation application may assign a probability to the transportation need based on the history of the user. For example, the transportation application may have a record of 100 restaurant payments for the user along with a record of 86 transportation needs reaching fruition following these payments. If the transportation application has a new transportation need likewise borne from a restaurant payment, the new transportation need may have a probability of 86%. Other embodiments of calculating probabilities of transportation needs from historical records are possible.

Alternatively, the transportation application may have a hard-coded probability for different transportation needs. The hard-coded probability may be related to the category of the transportation need. For example, the transportation application may automatically assign a probability of 80% for transportation needs associated with paying a bill at a bar, and assign a probability of 65% for transportation needs associated with upcoming appointments.

At block 250 the transportation application generates candidate transportation options. Candidate transportation options may be a list of means for satisfying the transportation need. The candidate transportation options may satisfy both the time parameter and the location parameter of the transportation need. For example, contacting a specific nearby taxi, contacting a taxi service/company which services the area, utilizing applicable bus routes, or utilizing public rapid transit (PRT) pods may be offered as candidate transportation options. For example, to satisfy a transportation need of "movie ending", the transportation application may generate a set of candidate transportation options which include "call independent taxi A", "call taxi corporation B", or "take bus 123". The transportation application may rank these candidate transportation options by how well the options satisfy the parameters of the transportation need.

For example, the taxi may be available now a block away, while the bus will come in 15 minutes, and the taxi company may have taxis available within a mile of the user. As such, the transportation application may rank the nearby taxi the best option, with the taxi company next, and the bus last. In some embodiments, the transportation application may also rank these candidate options by other parameters, such as a cost parameter or a preference parameter set by the user (e.g., trains are preferable to/ranked higher than taxis, which are preferable to/ranked higher than buses). In some embodiments, the user can create and edit these preferences. The transportation application may list the known prices of the options to help the user decide. In some embodiments, one of the candidate options will include walking, so the user has a baseline to compare against. The walking option may include such data as the time it will take and the current and expected weather.

At block 260 the transportation application provides the candidate transportation options to the user. The candidate transportation options may be provided to the user in the form of a notification. The notification may be presented using the mobile device of the user. The notification may provide the rankings of the candidate options. In some embodiments, the notification may provide functionality for the user to react in real-time on one or more of these candidate transportation options, such as a button to call a taxi or to bring up a bus schedule.

In some embodiments, the user may choose to decline the transportation need. In such embodiments, the transportation application may react to this by decreasing the probability associated with the triggering event. If the new probability is lowered below a certain level (e.g., less than a 50% chance the triggering event leads to a transportation need), the triggering event may be deactivated for the user.

In certain embodiments, the software notification may independently act on one or more of these candidate transportation options at the same time as the notification is provided. The transportation application may act by reserving or arranging for such transportation as the transportation need requires. The notification may then include this specific reservation information. A user may be able to activate or deactivate this automated/independent mode. Once activated, the transportation application may be set to automatically act for any transportation need which has a probability which passes a certainty threshold.

For example, the transportation application may have a certainty threshold of 90%. A user may have a 95% chance of requiring transportation after posting "getting ready to meet you, I just need to change and call a taxi" to a social media application. The transportation application may have collected this data after the social media application alerted the transportation application about a post which included a flagged word (e.g., "taxi"). The transportation application may then determine the transportation need to be at the home of the user as soon as possible. The transportation application may generate candidate options, and determine that, due to the current scarcity of taxis in the area, the top option would be a PRT pod. Upon ranking the PRT pod as the top option, the transportation application may detect that the certainty of the transportation need surpasses the certainty threshold and automatically reserve a PRT location. The transportation application may then provide the user with a notification which includes details on the PRT reservation.

Figure 3:
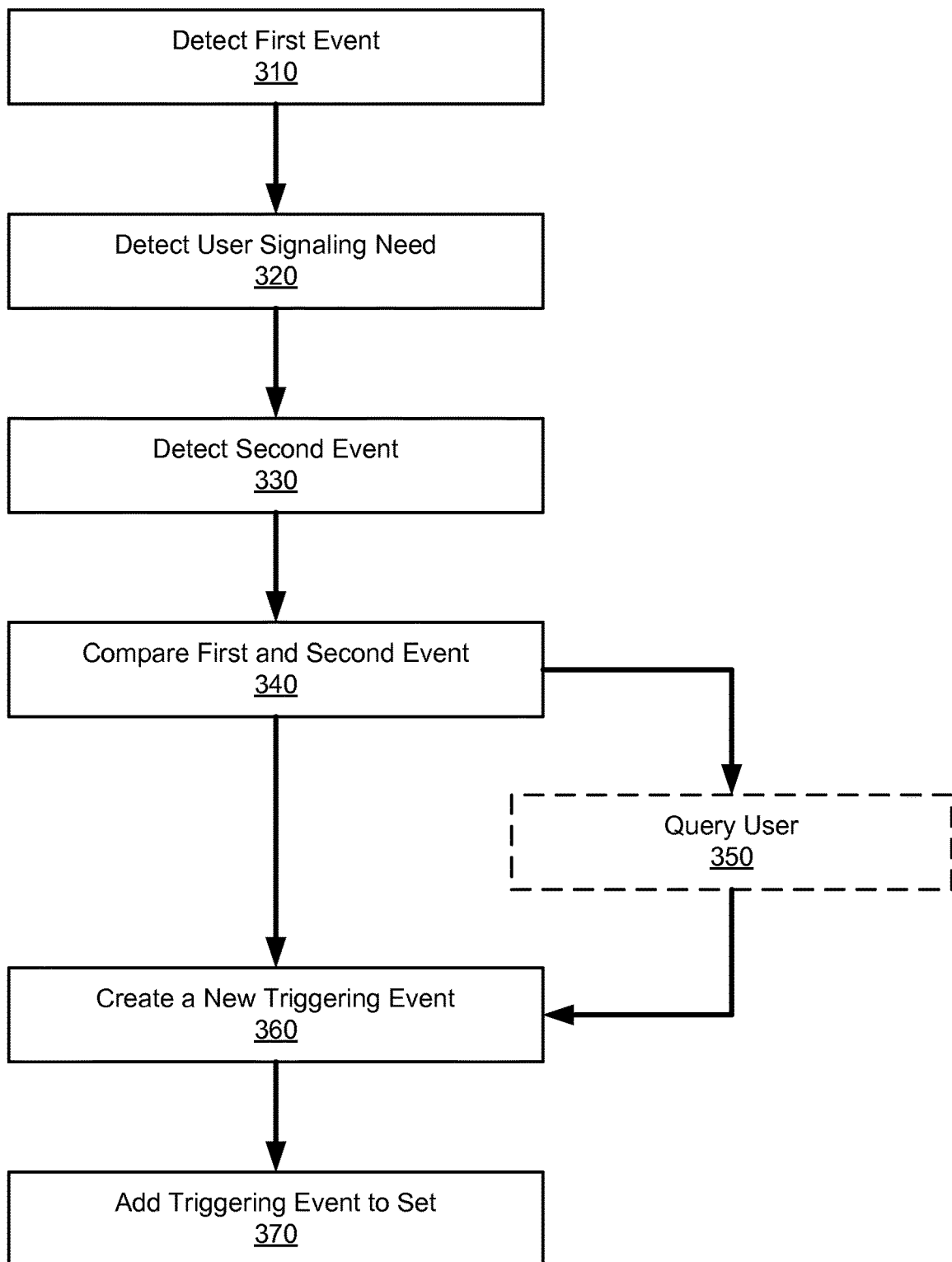
FIG. 3 is a method for a software application creating triggering events to manage transportation procurement, according to embodiments.

FIG. 3 is a flowchart illustrating a method 300 for creating triggering events for transportation procurement. The triggering events are created by a transportation application for managing transportation needs of a user. The transportation application may be processed by a mobile device of the user. In some embodiments, the device may be a cell phone. The visual arrangement of blocks in the flowchart of FIG. 3 is not to be construed as limiting the order in which the individual acts/operations may be performed, as certain embodiments may perform the operations of FIG. 3 in alternative orders. Blocks which are depicted with dashed lines are to be construed as optional operations.

At block 310 the transportation application detects a first event. The first event may be a situation which relates to a state of the user which is not associated with a triggering event at the time of the first event. For example, if the transportation application does not currently have a triggering event associated with paying a bill at a restaurant, the first event could be a transfer of money to a restaurant. The transportation application may detect the first event using application data. In this instance, the application data could be payment data from a mobile payment application of the mobile device. The application data may be information from other software applications on the mobile device as described herein.

At block 320 the transportation application detects the user signaling a need for transportation. The user may signal the need for transportation by using the mobile device. The mobile device may be used by calling a transportation company (e.g., calling for a taxi), reserving transportation using the internet (e.g., submitting an online request for a taxi), reserving transportation using another software application (e.g., communicating directly with a taxi using a mobile application-based transportation network), or checking transportation options (e.g., looking up bus/train schedules). The signaling for transportation may be detected using the other software applications/functionality of the device. For example, in the illustration above regarding transferring money to a restaurant, the transportation application may detect the user sending a request online using an internet application. Alternatively, the transportation application may use the application/functionality outgoing calls and detect a call to a number associated with a taxi company.

The transportation application may detect that the signaling for transportation occurs within a specific timeframe of the first event. For example, the transportation application may have a timeframe criterion of 15 minutes. If the user calls a taxi company within this timeframe (e.g., within 12 minutes of transferring money to a restaurant), the signaling for transportation satisfies the timeframe criterion. Once a user signals for transportation within the proper timeframe of the first event, the first event may be recorded as a potential triggering event by the transportation application. In certain embodiments, if the user does not signal a transportation need within the timeframe (e.g., within 15 minutes), the transportation application may delete the record of the first event as a potential triggering event.

The transportation application may detect a second event at block 330. The transportation application may detect the second event as described herein, and the second event may relate to a state of the user as described herein. Like the first event, the state of the user during the second event may not be associated with a triggering event at the time of the second event. For example, the transportation application may detect a second event of an exchange of money from the user to an establishment. Despite the first event, there may not yet be a triggering event relating to exchanging money from the user to the establishment at the time of the second event. The data on the exchange of money could be gained through a mobile payment application on the device.

At block 340 the transportation application compares the first event to the second event. The transportation application may compare the two using a similarity threshold (e.g., a test to determine if the first and second event are sufficiently similar). In order to determine if the first and second event meet the similarity threshold, the transportation application may compare characteristics (e.g., GPS data, establishment data gained from GPS data and online data, time data, establishment payment data, etc.) of the first and second event. The transportation application may compare the two events in response to the user signaling the transportation need within the timeframe in block 320. Put differently, the transportation application detects circumstances which immediately precede the user personally and purposefully procuring transportation for himself, and thereafter compares new sets of circumstances to the first set to determine a set of circumstances which is substantially similar to the first.

For example, the transportation application may compare the first event (paying a bill at a restaurant) with the second event (an exchange of money from the user to an establishment). While comparing the two, the application may determine that both events include a transaction, which increases the similarity between the two events. However, if online records gained by referencing GPS data identify the establishment of the second event as a shoe store, the transportation application may determine that the second event does not meet the similarity threshold. If the establishment is a coffee shop, the transportation application may determine that the second event meets the similarity threshold with a low amount of certainty. If the establishment is a chain restaurant, the transportation application may determine that the second event meets the similarity with a high amount of certainty.

At block 350, the transportation application may query the user. The query may include a binary (e.g., yes or no) prompt to verify whether or not the user currently has a transportation need or will soon have a transportation need. The transportation application may query the user in response to the second event being sufficiently similar to the first event. Put differently, since the transportation application detected that a unique set of circumstances preceded a transportation need in the past, the transportation application is determining whether or not a current similar set of circumstances (e.g., similar to the unique set) predicts a transportation need in the present or near future. For example, if the establishment was a chain restaurant as detailed above, the transportation application may determine that the second event satisfied the similarity threshold, and in response may query the user using a GUI with a message which includes the text "Do you need transportation at this time?" and "yes" or "no" reply options.

In some embodiments, the query from the transportation application to the user may include a third option of an atypical denial of a transportation need. An atypical denial may reflect that a user does not currently need transportation, but typically would in this situation. For example, the user may consistently get a taxi after dining out but, for the second event, happened to dine with a friend who offered to drive the user home.

To accurately capture an atypical denial from a user, the transportation application query may include numerous types of options. For example, an atypical denial option may be "Not this time" to signify a possibility of a future need following a future occurrence of the respective triggering event. Alternatively, the atypical denial option may be "Never from this location," to signify a possible need following a future occurrence of the triggering event from a different location (e.g., a future triggering event associated with sufficiently distinct GPS data). In other embodiments, the atypical denial may be "Never at this time," to signify a possible future needs following future occurrences of the triggering event at a different time of day (e.g., a future triggering event associated with sufficiently distinct clock data). Other atypical denial query options are also possible. By prompting the user with queries which include an "atypical denial" option, the transportation application may eliminate some false negative responses to user prompts.

Alternatively, the transportation application may use social media or social networks to detect atypical denials. Social networks may be used to detect that a primary user is with a physical proximity of another user (e.g., standing next to each other), determine that the other user is associated with the primary user (e.g., the primary user is at an event with the other user), detect that the other user successfully procures transportation (e.g., the other user uses the transportation application to hail a cab), and detects that the primary user maintains a close proximity with the other user during transportation (e.g., the primary user shares the cab). If the other user obtains transportation and the primary user denies a transportation need, the denial may be an atypical denial simply because another means to satisfy the transportation need was selected by the primary user. By using social media and social networks, the transportation network may correctly categorize a denial as atypical without prompting from the user.

At block 360, the transportation application creates a new triggering event. The new triggering event may include the characteristics which were shared by the first event and the second event. These shared characteristics may be the qualities which allowed the first and second event to meet the similarity threshold. For example, the similar qualities of the first and second event were a transaction involving a restaurant. The new triggering event may therein be classified as a situation where a payment is made at a restaurant.

In some embodiments, the application may create the triggering event in response to determining that the first and second event meet the similarity threshold at block 340. In other embodiments, the application may create the triggering event in response to an affirmative response from the user. Specifically, the triggering event may be created in response to the user responding to the query from block 350 with an affirmative response. For example, after sending a query of "Do you need transportation at this time?" at block 350, the application may receive a response of "yes" from the user. The application may then create the triggering event in response to this affirmative answer. The application may also create the triggering event in response to atypical denial responses (e.g., a user responds by confirming that they do not currently need transportation, but they typically would in this situation). However, if the application receives an answer of "no" from the user in response to the block 350 query, the application may elect to not create a triggering event. In this way the application may avoid creating a triggering event in reaction to an atypical and/or singular transportation need (e.g., a transportation need which the user does not expect to repeat).

At block 370, the transportation application adds the new triggering event to the set of triggering events (e.g., the set of triggering event templates). After the addition, the new triggering event may be used to determine and provide candidate transportation options for a user to satisfy transportation needs, such as described above with respect to method 200 in FIG. 2.

Figure 4:
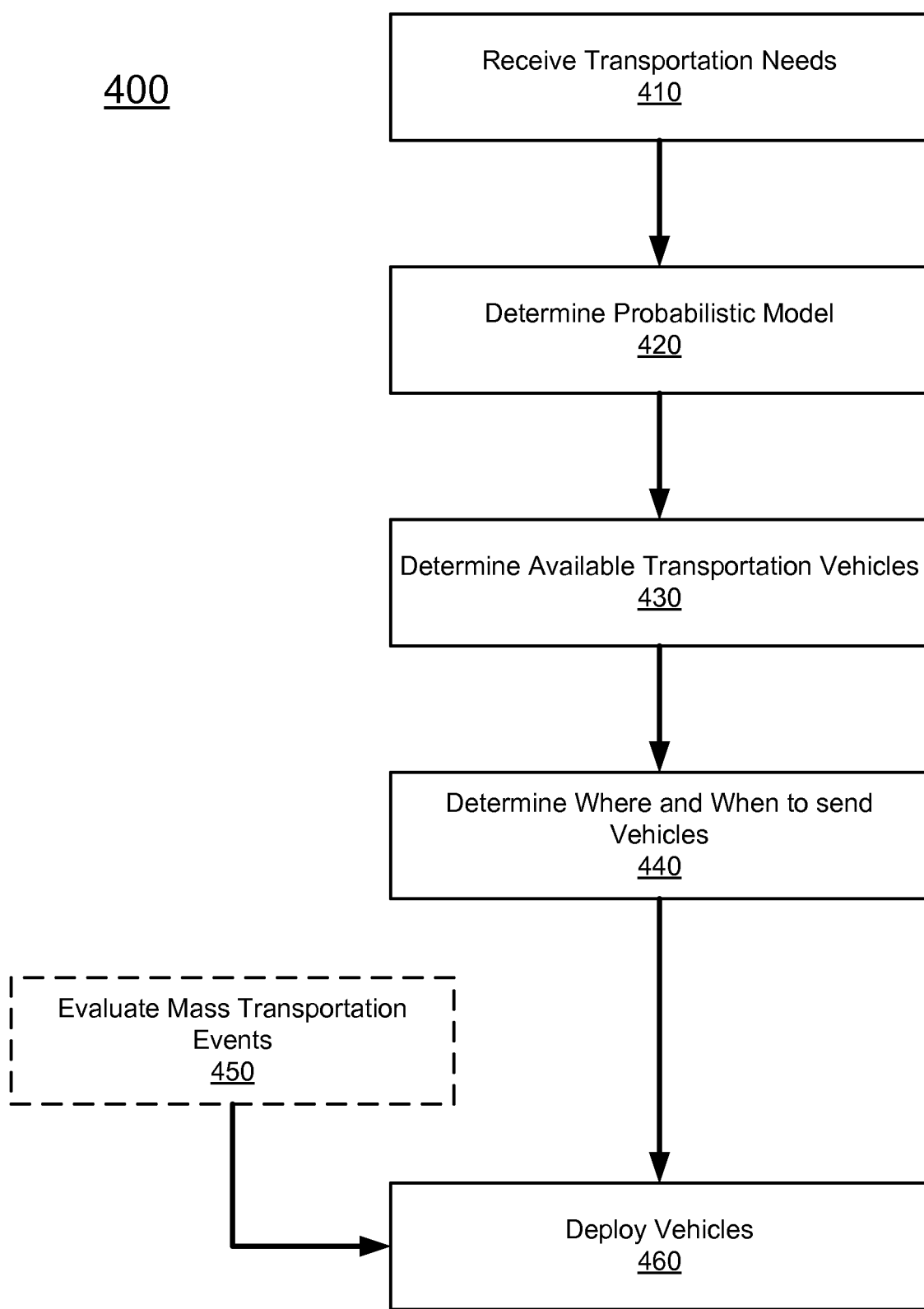
FIG. 4 is a method for managing transportation deployment using customer activity, according to embodiments.

FIG. 4 is a flowchart illustrating a method 400 for deploying a fleet of transportation vehicles using transportation needs from potential customers. The transportation needs may be detected and sent by a plurality of instances of a transportation application on one or more user devices as described herein. These transportation needs may be received by a transportation provider (e.g., a taxi company or a transportation organization). The provider may use the plurality of needs to create a set of probabilities for transportation needs across the service area of the provider. Using real-time transportation needs of users across a service area to deploy transportation may allow the transportation provider to better forecast and capture need across the provider's service area. The visual arrangement of blocks in the flowchart of FIG. 4 is not to be construed as limiting the order in which the individual acts/operations may be performed, as certain embodiments may perform the operations of FIG. 4 in alternative orders. Blocks which are depicted with dashed lines are to be construed as optional operations. Examples and example values provided in the discussion of FIG. 4 are given for purpose of illustration only and are not to be construed as limiting.

A plurality of instances of the transportation application as described herein may determine a plurality of transportation needs. These transportation applications may be processed by a number of devices for a number of users. For example, across a large city several thousand users may have installed the transportation application onto cell phone, and a few hundred may have encountered a triggering event. The transportation application instances on the phones of the users may process these triggering events, creating and providing candidate transportation events as in method 200.

At block 410 the transportation provider receives a plurality of transportation needs. These transportation needs may be the needs processed by the plurality of transportation application instances discussed above. The plurality of transportation needs may include both time and location parameters. The time and location parameters may identify the specific places and times at which the transportation needs are expected to materialize. The transportation needs are received from a plurality of users (e.g., via user accounts). User accounts may be associated with users who use the transportation provider or plan to use the transportation provider. The plurality of transportation needs, as described herein, do not require direct user intervention to be detected by a transportation application and received by the transportation provider. In other words, the transportation provider may receive data on the current actions on potential customers when those customers are trending towards having an immediate need for the services of the transportation provider. This real-time data on upcoming demand for the services of the transportation provider may allow the transportation provider to more efficiently meet demand.

For example, the transportation provider may receive 100 transportation needs. These needs may include forty at a mall: ten at 6:00, twenty at 7:00, and ten at 8:00. The needs may include thirty at a bar: ten at 6:00, ten at 7:00, and ten at 8:00. The needs may also include thirty at a coffee shop at 6:00. Each of these transportation needs may be within a service area of the transportation provider. In certain embodiments, any transportation need outside of the service area of the transportation provider may be discounted and/or deleted.

At block 420, the transportation provider determines a probabilistic model for transportation needs across a set of locations and times. These locations and times may be the same locations and times from the transportations needs of 410. Probabilities of the model may relate to the likelihood of transportation being needed at one of the locations at one of the times. The transportation provider may determine these probabilities based on the transportation needs from block 410.

For example, in the illustration above with 100 transportation needs for the mall, bar, and coffee shop, the transportation may have a final probabilistic model with seven probabilistic outcomes, one for each location/time combination (e.g., three outcomes for the mall, three outcomes for the bar, and one outcome for the coffee shop, for a total of seven). Each probabilistic outcome of the model may reflect the predicted number of transportation needs. The transportation provider may have preset rules for creating the probabilistic model based on location and time. For example, the transportation provider may assign higher predicted number to a location and time which has more needs, or may also assign higher predicted numbers to certain locations by default, or higher predicted numbers to certain locations at certain times. In the example, the coffee shop had three times as many transportation needs from block 410 at 6:00 than the mall. As such, even if it is more likely that a given transportation need at the mall will be realized than a given transportation need at the coffee shop, the probabilistic model may have a higher predicted number of needs at the coffee shop at 6:00 (e.g., a predicted 10.5 needs for the coffee shop and a predicted 5.1 needs for the mall at 6:00). At the same time, even though the bar has the same amount of needs per hour, the transportation provider may assign higher predicted numbers each successive hour (e.g., 5.5 at 6:00, 6.1 at 7:00, 8.9 at 8:00).

Alternatively, the transportation provider may have rules for creating the probabilistic model based on the category of the transportation need. The category may be received with the time and location parameter in block 220. The category of the transportation need may indicate the state of the user which led to the transportation need. For example, the 20 transportation needs at the mall at 7:00 may include ten needs with a category of "purchase of goods" which have a low probability, six needs of category "purchase of meal" which has a higher probability, and five needs of category "completed film" which has the higher probability still. Using these probabilities, the probabilistic model may result in a predicted need of 10.6, with the largest categories resulting in the lowest contributions (e.g., 3.0 needs from purchase of goods, 3.5 needs from meal purpose, 4.1 needs from completed film). In certain embodiments, the transportation provider may use only rules related to category rather than rules attached to certain locations and times and types to create the probabilistic model.

In certain embodiments, transportation needs received by the transportation provider may include probabilities. These probabilities may reflect the likelihood that the need for transportation will come to fruition for the user associated with the transportation need. The transportation provider may use these probabilities to determine the probabilistic model. For example, if 5 of the needs from the bar at 8:00 come with a probability of 50%, the predicted number for that location and hour may decrease from 8.9 to 5.6. In certain embodiments, the transportation provider may use only probabilities from the transportation needs rather than rules attached to certain locations and times and types to create the probabilistic model. Alternatively, the transportation model may use all three tactics (e.g., rules related to time/location, rules related to category, probabilities including in needs) or a combination thereof to create the probabilistic model.

At block 430 the transportation provider determines which vehicles are available. The transportation provider may use an available criterion to determine if a vehicle is available. A vehicle may satisfy an availability criterion if it is not currently in use by a customer. Alternatively, for a company with a large service area, a vehicle may satisfy an availability criterion if it not currently booked for a time of the probabilistic model and has the ability to reach a location of the probabilistic model by said time.

At block 440 the transportation provider determines some of the vehicles to send to locations of the probabilistic model at times of the probabilistic model. The transportation provider may determine to send less than all vehicles that are available to maintain a balanced deployment across the service area. The transportation provider may also determine to not send vehicles to all locations at all times, depending upon the predicted number of needs at those location/time combinations. For example, if only six transportation vehicles were available at 6:00, the transportation provider might only deploy three (e.g., leaving the other three transportation vehicles to default or previous operation plans), and it may send all three to the coffee shop, given that the coffee shop had the highest result within the example probabilistic model.

At block 450 the transportation provider may evaluate mass transportation events. Mass transportation events may be predictable instances where a high percentage of vehicles are expected to be at capacity. Transportation providers may modify this percentage. A transportation provider may have a mass transportation event for every non-holiday weekday during the typical beginning of the work day (e.g., from 7:00 A.M until 9:00 A.M) and the typical end of the work day (e.g., from 4:00 P.M. until 6:00 P.M.), as the majority of vehicles may reliably be expected to be at capacity bringing customers to and from work, respectively. Additionally, transportation providers may classify sporting events, holidays, or festivals as mass transportation events. In certain embodiments, the transportation provider may use the transportation needs in response to a lack of mass transportation events. Put differently, before a transportation provider uses the real-time information from users to determine vehicle deployment plans, the provider may check to verify that there is an appreciable amount of vehicles not already accounted for.

The transportation provider may determine what mass events will occur of a specific time window or operating horizon. For example, providers may forecast deployment in 4 hour intervals, and may therein determine the number of mass transportation events within the next four hours. The provider may then evaluate this time window to verify that the number and magnitude of mass transportation events will stay within a normal operation range (e.g., a range in which an appreciable amount of taxis are available to be deployed to transportation needs).

Once the transportation provider determines which vehicles to send where and at what times, the transportation provider deploys the vehicles as determined at block 460. In certain embodiments, the provider may only deploy vehicles in response to determining that the mass transportation events are within a normal operating range as described above. A provider may use method 400 to dynamically change current deployments and redeployments as new transportation needs arrive. If the transportation provider receives a new set of transportation needs which change the probabilistic model, the transportation model may redirect transportation vehicles to accommodate this new model. For example, at 5:45 the transportation provider may deploy three transportation vehicles to the coffee shop as detailed above. At 5:50, the transportation provider may receive 50 transportation needs with a 70% certainty for a local church, where a wedding ceremony just concluded. In response to this second set of transportation needs, the transportation provider may create a new probabilistic model and redirect all the three vehicles to the church. The provider may also send the other three vehicles, which were originally undeployed and left to previous plans, to the church. In this way, the transportation provider may dynamically detect and react to real-time developments of potential customers across a service area which may directly precede demand for transportation.

Figure 5:
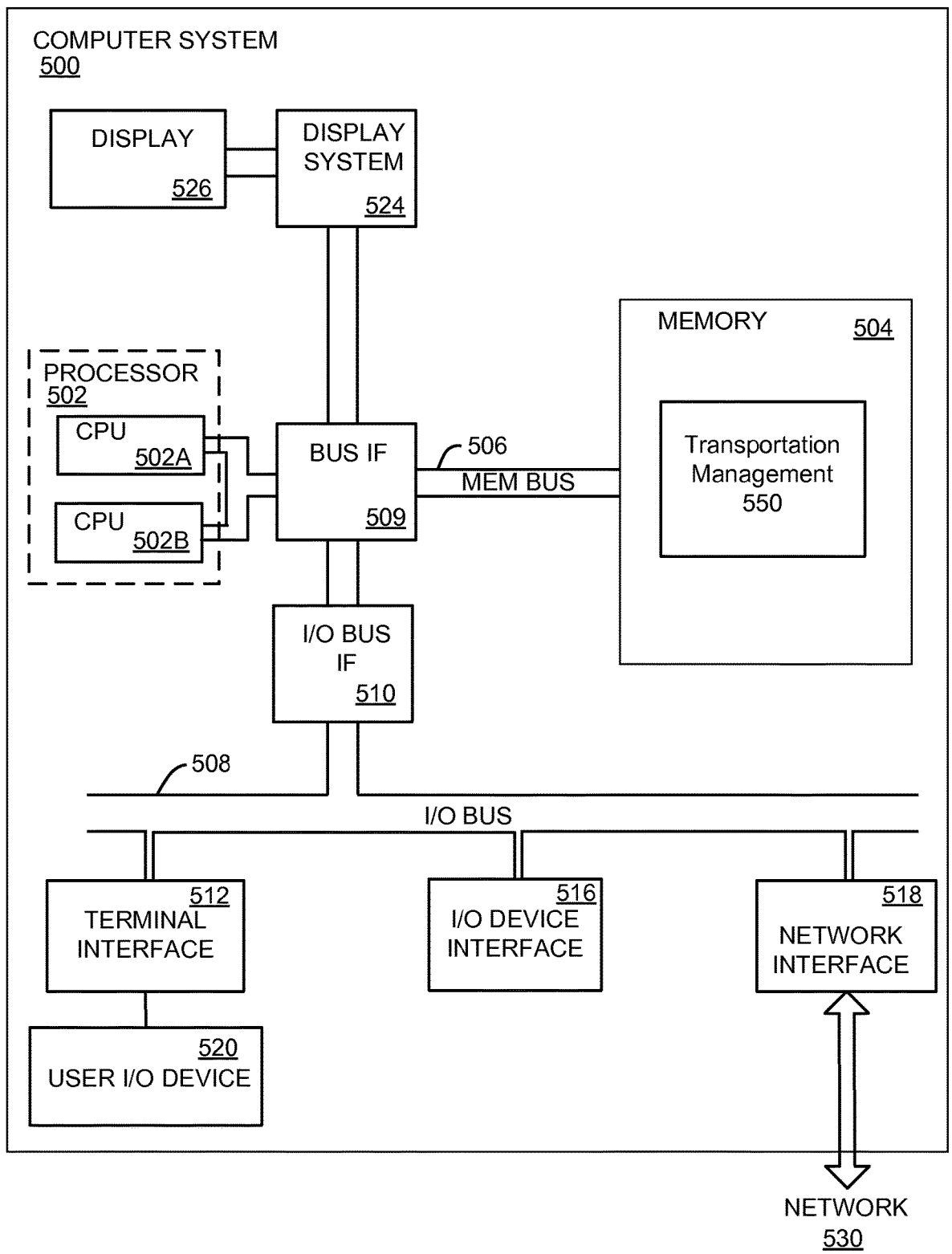
FIG. 5 is an apparatus for managing transportation procurement and deployment, according to embodiments.

FIG. 5 depicts a high-level block diagram of a computer system 500 for which can be used to implement the host device or user device discussed above in FIG. 1. The components of the various embodiments disclosed herein apply equally to any appropriate computing system. The components of the example computer system 500 shown in FIG. 5 include one or more processors 502, a memory 504, a terminal interface 512, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions—such as the instructions from the transportation management application 550 to perform the acts described with respect to method 200—stored in the memory 504 and may include one or more levels of on-board cache.

In embodiments, the memory 504 may include a random-access semiconductor memory, storage device, or storage medium (either volatile or non-volatile) for storing or encoding data and programs. The memory 504 can include the user history as described herein. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can the user history and/or the transportation management application 550. In this illustrative embodiment, the transportation management application 550 includes instructions or statements that execute on the processor 502 or instructions or statements that are interpreted by instructions or statements that execute on the processor 502 to carry out functions (e.g., the acts of method 200, 300, and/or 400) as further described below. However, in other embodiments, the transportation management application 550 is implemented in hardware via semiconductor devices, chips, logical gates, circuits, circuit cards, and/or other physical hardware devices (e.g., ASIC of FPGA) in lieu of, or in addition to, a processor-based system. Additionally, in some embodiments, the transportation management application 550 may include data in addition to instructions or statements.

In this example, the computer system 500 includes a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 420.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

FIG. 5 depicts several example components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The functionality outlined in the discussions herein regarding FIG. 2, FIG. 3, and FIG. 4 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method performed by a software application on a device managing transportation procurement for a user, the method comprising:
    collecting a first set of application data from a plurality of software applications on the device, wherein the plurality of software applications includes a clock application, a mobile payment application, and a texting application;
    detecting a triggering event based on the first set of application data, wherein the triggering event corresponds to a state of the user, and wherein the state of the user is determined by comparing historical application data corresponding to one or more user-created triggering events to current application data to generate a probability of a transportation need, wherein the probability is based on at least a set of rules related to time, a set of rules related to event category, and a set of rules related to transportation needs, the probability meeting a threshold, and wherein the probability is first assigned according to a location parameter and subsequently adjusted according to a number of transportation needs for a plurality of users at the location parameter at a particular time;
    in response to the triggering event, determining the transportation need of the user based on the first set of application data without direct input from the user, wherein the transportation need includes both the particular time and the location parameter, and wherein the location parameter is located within a service area of a transportation provider;
    generating, based on both the particular time and the location parameter, a set of candidate transportation options for the user which satisfy the transportation need, wherein the candidate transportation options are ranked according to user preference, and wherein a first candidate transportation option includes walking and further includes a weather report, and wherein a second candidate transportation option includes public transportation and further includes a public transportation schedule;
providing, to the user, a notification including the set of candidate transportation options;
receiving, from the user, a confirmation of one of the set of candidate transportation options;
transmitting, to the transportation provider, a requested transportation need for the user;
detecting a non-triggering event, based on a second set of application data collected from the clock application, the mobile payment application, and the texting application, wherein the second set of application data excludes one or more applications from the first set of application data, based on a determination that the one or more applications from the first set of application data do not affect the generation of the probability for the transportation need;
comparing the second set of application data to the first set of application data;
in response to the comparison, determining the triggering event and the non-triggering event are similar;
receiving, from the user, confirmation that the triggering event and the non-triggering event are similar; redefining the non-triggering event as a second triggering event; and
transmitting, to the transportation provider, a second requested transportation need for the user.

2. The method of claim 1, wherein detecting the triggering event further comprises:
comparing characteristics of the first set of application data to characteristics of a set of triggering events, wherein the set of triggering events includes the triggering event; and
determining that the characteristics of the triggering event meet a similarity threshold to the characteristics of the first set of application data.

3. The method of claim 1, further comprising:
detecting the triggering event by matching the triggering event to a corresponding triggering event template of a set of triggering event templates; and
creating a new triggering event template for the set of triggering event templates.

4. The method of claim 3, wherein creating the new triggering event comprises:
detecting, using a first set of application data from a calendar application, a first event, wherein characteristics of the first event do not meet a similarity threshold to characteristics of the set of triggering event templates;
detecting the user signaling a first transportation need within a timeframe criterion of the first event based on the first set of application data from the plurality of software applications;
detecting, using a second set of application data from the plurality of software applications, a second event;
comparing, using a similarity threshold characteristic of the first event and the second event;
creating, in response to the similarity threshold being satisfied, a new triggering event template which includes a set of characteristics of the first event and second event which satisfied the similarity threshold; and
adding, in response to the similarity threshold being satisfied, the new triggering event template to the set of triggering event templates.

5. The method of claim 4, further comprising:
querying, in response to the similarity threshold being satisfied, the user to verify a second transportation need; and
adding the new triggering event template to the set of triggering event templates in response to receiving a verification of the second transportation need from the user.

6. The method of claim 4, wherein querying the user includes the user being provided with an option to verify a current transportation need for the user, an option to deny a current transportation need for the user, or to verify an atypical lack of a current transportation need for the user, wherein the atypical lack of the current transportation need is detected based on a physical proximity of the user to a second user associated with the user.

7. The method of claim 1, further comprising: detecting, using historical data related to the user, that the transportation need has a probability of occurring which meets a certainty threshold, wherein the historical data is classified according to the category of the transportation need, and wherein the probability includes a frequency at which the user has historically requested transportation for the category of transportation need, and wherein the historical data is gathered, at least in part, by monitoring text messages and social media posts from the user; and
sending, to the transportation provider, in response to the probability meeting the certainty threshold, a request for transportation based on the particular time and the location parameter.

8. The method of claim 7, wherein the request for transportation is sent to the transportation provider without querying the user.

9. A computer system comprising:
a memory;
one or more processing circuits communicatively coupled to the memory, wherein the one or more processing circuits are configured to:
collect a first set of application data from a plurality of software applications on the device, wherein the plurality of software applications includes a clock application, a mobile payment application, and a texting application;
detect a triggering event based on the first set of application data, wherein the triggering event corresponds to a state of the user, and wherein the state of the user is determined by comparing historical application data corresponding to one or more user-created triggering events to current application data to generate a probability of a transportation need, wherein the probability is based on at least a set of rules related to time, a set of rules related to event category, and a set of rules related to transportation needs, the probability meeting a threshold, and wherein the probability is first assigned according to a location parameter and subsequently adjusted according to a number of transportation needs for a plurality of users at the location parameter at a particular time;
in response to the triggering event, determine the transportation need of the user based on the first set of application data without direct input from the user, wherein the transportation need includes both the particular time and the location parameter, and wherein the location parameter is located within a service area of a transportation provider;
generate, based on both the particular time and the location parameter, a set of candidate transportation options for the user which satisfy the transportation need, wherein the candidate transportation options are ranked according to user preference, and wherein a first candidate transportation option includes walking and further includes a weather report, and wherein a second candidate transportation option includes public transportation and further includes a public transportation schedule;

provide, to the user, a notification including the set of candidate transportation options; receive, from the user, a confirmation of one of the set of candidate transportation options;

transmit, to the transportation provider, a requested transportation need for the user;

detect a non-triggering event, based on a second set of application data collected from the clock application, the mobile payment application, and the texting application, wherein the second set of application data excludes one or more applications from the first set of application data, based on a determination that the one or more applications from the first set of application data do not affect the generation of the probability for the transportation need;

compare the second set of application data to the first set of application data;

in response to the comparison, determine the triggering event and the non-triggering event are similar;

receive, from the user, confirmation that the triggering event and the non-triggering event are similar;

re-define the non-triggering event as a second triggering event; and transmit, to the transportation provider, a second requested transportation need for the user.

10. The system of claim 9, wherein the one or more processing circuits are configured to detect the triggering event by the one or more processing circuits being further configured to:
    compare characteristics of the first set of application data to characteristics of a set of triggering events, wherein the set of triggering events includes the triggering event; and
    determine that the characteristics of the triggering event meet a similarity threshold to the characteristics of the first set of application data.

11. The system of claim 9, wherein the one or more processing circuits are further configured to:
    detect the triggering event by matching the triggering event to a corresponding triggering event template of a set of triggering event templates; and
    create a new triggering event template for the set of triggering event templates.

12. The system of claim 11, wherein the one or more processing circuits are configured to create the new triggering event by the one or more processing circuits being further configured to:
    detect, using a first set of application data from a calendar application, a first event, wherein characteristics of the first event do not meet a similarity threshold to characteristics of the set of triggering event templates;
    detect the user signaling a first transportation need within a timeframe criterion of the first event based on the first set of application data from the plurality of software applications;
    detect, using a second set of application data from the plurality of software applications, a second event;
    compare, using a similarity threshold characteristics of the first event and the second event;
    create, in response to the similarity threshold being satisfied, a new triggering event template which includes a set of characteristics of the first event and second event which satisfied the similarity threshold; and
    add, in response to the similarity threshold being satisfied, the new triggering event template to the set of triggering event templates.

13. The system of claim 12, wherein the one or more processing circuits are further configured to:
    query, in response to the similarity threshold being satisfied, the user to verify a second transportation need; and
    add the new triggering event template to the set of triggering event templates in response to receiving a verification of the second transportation need from the user.

14. The system of claim 12, wherein querying the user includes the user being provided with an option to verify a current transportation need for the user, an option to deny a current transportation need for the user, or to verify an atypical lack of a current transportation need for the user, wherein the atypical lack of the current transportation need is detected based on a physical proximity of the user to a second user associated with the user.

15. The system of claim 9, wherein the one or more processing circuits are further configured to: detect, using historical data related to the user, that the transportation need has a probability of occurring which meets a certainty threshold, wherein the historical data is classified according to the category of the transportation need, and wherein the probability includes a frequency at which the user has historically requested transportation for the category of transportation need, and wherein the historical data is gathered, at least in part, by monitoring text messages and social media posts from the user; and
    send, to the transportation provider, in response to the probability meeting the certainty threshold, a request for transportation based on the particular parameter and the location parameter.

16. The system of claim 15, wherein the request for transportation is sent to the transportation provider without querying the user.

17. A computer program product comprising a computer readable storage medium and computer program instructions that, when executed by a computer processor of a computer, cause the computer to:
    collect a first set of application data from a plurality of software applications, wherein the plurality of software applications includes a clock application, a mobile payment application, and a texting application;
    detect a triggering event based on the first set of application data, wherein the triggering event corresponds to a state of the user, and wherein the state of the user is determined by comparing historical application data corresponding to one or more user-created triggering events to current application data to generate a probability of a transportation need, wherein the probability is based on at least a set of rules related to time, a set of rules related to event category, and a set of rules related to transportation needs, the probability meeting a threshold, and wherein the probability is first assigned according to a location parameter and subsequently adjusted according to a number of transportation needs for a plurality of users at the location parameter at a particular time;
    in response to the triggering event, determine the transportation need of the user based on the first set of application data without direct input from the user, wherein the transportation need includes both the particular time and the location parameter, and wherein the location parameter is located within a service area of a transportation provider;

generate, based on both the particular time and the location parameter, a set of candidate transportation options for the user which satisfy the transportation need, wherein the candidate transportation options are ranked according to user preference, and wherein a first candidate transportation option includes walking and further includes a weather report, and wherein a second candidate transportation option includes public transportation and further includes a public transportation schedule;

provide, to the user, a notification including the set of candidate transportation options;

receive, from the user, a confirmation of one of the set of candidate transportation options;

transmit, to the transportation provider, a requested transportation need for the user; detect a non-triggering event, based on a second set of application data collected from the clock application, the mobile payment application, and the texting application, wherein the second set of application data excludes one or more applications from the first set of application data, based on a determination that the one or more applications from the first set of application data do not affect the generation of the probability for the transportation need;

compare the second set of application data to the first set of application data;

in response to the comparison, determine the triggering event and the non-triggering event are similar;

receive, from the user, confirmation that the triggering event and the non-triggering event are similar;

re-define the non-triggering event as a second triggering event; and transmit, to the transportation provider, a second requested transportation need for the user.

18. The computer program product of claim 17, wherein executed computer program instructions further cause the computer to: compare characteristics of the first set of application data to characteristics of a set of triggering events, wherein the set of triggering events includes the triggering event; and determine that the characteristics of the triggering event meet a similarity threshold to the characteristics of the first set of application data.

19. The computer program product of claim 17, wherein executed computer program instructions further cause the computer to: detect the triggering event by matching the triggering event to a corresponding triggering event template of a set of triggering event templates; and create a new triggering event template for the set of triggering event templates by the one or more processing circuits being further configured to: detect, using a first set of application data from a calendar application, a first event, wherein characteristics of the first event do not meet a similarity threshold to characteristics of the set of triggering event templates;

detect the user signaling a first transportation need within a timeframe criterion of the first event based on the first set of application data from the plurality of software applications; detect, using a second set of application data from a calendar application, a second event;

compare, using a similarity threshold characteristics of the first event and the second event; create, in response to the similarity threshold being satisfied, a new triggering event template which includes a set of characteristics of the first event and second event which satisfied the similarity threshold; and add, in response to the similarity threshold being satisfied, the new triggering event template to the set of triggering event templates.

20. The computer program product of claim 17, wherein executed computer program instructions further cause the computer to: detect, using historical data related to the user, that the transportation need has a probability of occurring which meets a certainty threshold, wherein the historical data is classified according to the category of the transportation need, and wherein the probability includes a frequency at which the user has historically requested transportation for the category of transportation need, and wherein the historical data is gathered, at least in part, by monitoring text messages and social media posts from the user; and send, to the transportation provider, in response to the probability meeting the certainty threshold, a request for transportation based on the particular time and the location parameter.

* * * * *